US012615533B2

(12) United States Patent
Chen et al.

(10) Patent No.: US 12,615,533 B2
(45) Date of Patent: Apr. 28, 2026

(54) LATENCY MANAGEMENT IN INTEGRATED ACCESS AND BACKHAUL NETWORKS

(71) Applicant: ZTE Corporation, Shenzhen (CN)

(72) Inventors: Lin Chen, Shenzhen (CN); Ying Huang, Shenzhen (CN); Liping Wang, Shenzhen (CN); Hao Zhu, Shenzhen (CN); Xueying Diao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 567 days.

(21) Appl. No.: 18/164,819

(22) Filed: Feb. 6, 2023

(65) Prior Publication Data

US 2023/0189045 A1 Jun. 15, 2023

Related U.S. Application Data

(63) Continuation of application No. PCT/CN2020/107479, filed on Aug. 6, 2020.

(51) Int. Cl.
*H04W 24/10* (2009.01)
*H04L 45/121* (2022.01)
*H04W 40/24* (2009.01)

(52) U.S. Cl.
CPC .......... *H04W 24/10* (2013.01); *H04L 45/121* (2013.01); *H04W 40/24* (2013.01)

(58) Field of Classification Search
CPC ..... H04W 24/10; H04W 40/24; H04W 72/04; H04W 72/20; H04W 72/23; H04W 72/27; H04W 72/53; H04W 72/54; H04W 72/12; H04W 24/08; H04W 28/02; H04W 74/08; H04W 76/27; H04W 76/28; H04W 92/10;

H04W 92/20; H04L 45/12; H04L 45/00; H04L 45/70; H04L 45/38; H04L 1/18; H04L 12/34; H04L 47/28

(Continued)

(56) References Cited

U.S. PATENT DOCUMENTS 11,483,731 B2 * 10/2022 Hampel ............ H04W 28/0263
11,503,586 B2 * 11/2022 Jo ......................... H04W 72/04

(Continued)

FOREIGN PATENT DOCUMENTS

CN 111052837 A 4/2020
WO 2020029196 A1 2/2020

(Continued)

OTHER PUBLICATIONS

Extended European Search Report for European Patent Application No. 20948609.1, mailed Oct. 31, 2023 (9 pages).

(Continued)

*Primary Examiner* — Man U Phan
(74) *Attorney, Agent, or Firm* — Perkins Coie LLP

(57) ABSTRACT

Methods, systems, and devices for latency management in integrated access and backhaul (IAB) networks for mobile communications are described. An example method for wireless communication includes receiving, by a first network node from a second network node, a measurement configuration, performing, based on the measurement configuration, one or more latency measurements, and transmitting, to the second network node, a measurement report comprising the one or more latency measurements or an identification of the channel used for the one or more latency measurements.

12 Claims, 10 Drawing Sheets

(58) Field of Classification Search
USPC ............................................... 370/252
See application file for complete search history.

(56) References Cited

U.S. PATENT DOCUMENTS

| 11,528,654 | B2 * | 12/2022 | Akl | ..................... | H04W 40/02 |
| 11,729,662 | B2 * | 8/2023 | Luo | ..................... | H04L 45/123 |
| | | | | | 370/236 |
| 11,751,100 | B2 * | 9/2023 | Mao | .................. | H04W 28/086 |
| | | | | | 370/329 |
| 11,856,619 | B2 * | 12/2023 | Teyeb | ................. | H04W 76/10 |
| 11,864,085 | B2 * | 1/2024 | Tesanovic | ......... | H04W 28/0268 |
| 11,889,342 | B2 * | 1/2024 | Liu | ..................... | H04L 43/091 |
| 11,937,163 | B2 * | 3/2024 | Akl | ..................... | H04W 40/02 |
| 2020/0100124 | A1 | 3/2020 | Hampel et al. | | |
| 2020/0187040 | A1 * | 6/2020 | Tsai | ..................... | H04W 24/10 |
| 2022/0078808 | A1 * | 3/2022 | Luo | .................. | H04W 28/0268 |
| 2023/0044810 | A1 * | 2/2023 | Zhuo | .................. | H04W 72/27 |
| 2023/0300685 | A1 * | 9/2023 | Xu | .................. | H04W 36/0033 |
| | | | | | 455/436 |

FOREIGN PATENT DOCUMENTS

| WO | 2020088529 | A1 | 5/2020 |
| WO | 2020088815 | A1 | 5/2020 |

OTHER PUBLICATIONS

ZTE, "Latency analysis for IAB network," 3GPP TSG-RAN WG2#103, R2-1812465, Gothenburg, Sweden, Aug. 20-24, 2018 (5 pages).

ZTE, "Latency analysis for IAB network," 3GPP TSG-RAN WG2#103bis, R2-1814722, Chengdu, China, Oct. 8-12, 2018 (5 pages).

International Search Report and Written Opinion for International Application No. PCT/CN2020/107479, mailed on May 6, 2021 (9 pages).

Office Action for Chinese Patent Application No. 202408050148041. 0, mailed Aug. 5, 2024 (27 pages).

* cited by examiner

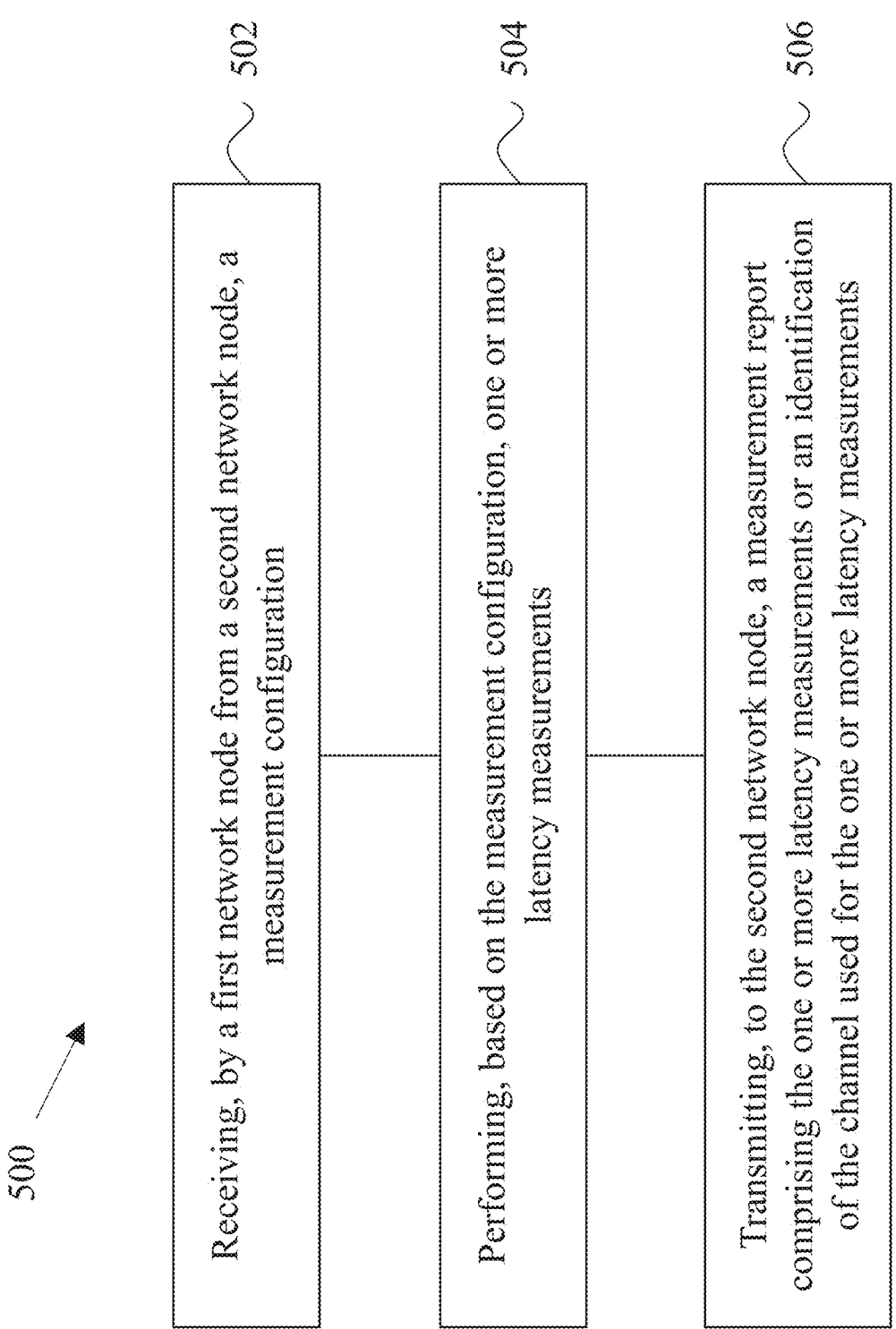

500

502 — Receiving, by a first network node from a second network node, a measurement configuration 504 — Performing, based on the measurement configuration, one or more latency measurements 506 — Transmitting, to the second network node, a measurement report comprising the one or more latency measurements or an identification of the channel used for the one or more latency measurements

Transmitting, by a second network node to a first network node, a measurement configuration

534

Receiving, subsequent to the transmitting, a measurement report comprising one or more latency measurements or an identification of the channel used for the one or more latency measurements

560

Configuring, by a first network node, a discard timer for a backhaul channel — 562

Determining, based on the discard timer, whether a data packet that is received is subsequently transmitted on the backhaul channel or discarded — 564

LATENCY MANAGEMENT IN INTEGRATED ACCESS AND BACKHAUL NETWORKS

CROSS REFERENCE TO RELATED APPLICATIONS

This patent document is a continuation of and claims benefit of priority to International Patent Application No. PCT/CN2020/107479, filed on Aug. 6, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for latency management in integrated access and backhaul (IAB) networks for mobile communications, including 5th Generation (5G) and New Radio (NR) communication systems.

In one exemplary aspect, a wireless communication method is disclosed. The method includes receiving, by a first network node from a second network node, a measurement configuration, performing, based on the measurement configuration, one or more latency measurements, and transmitting, to the second network node, a measurement report comprising the one or more latency measurements or an identification of the channel used for the one or more latency measurements.

In another exemplary aspect, a wireless communication method is disclosed. The method includes transmitting, by a second network node to a first network node, a measurement configuration, and receiving, subsequent to the transmitting, a measurement report comprising one or more latency measurements or an identification of the channel used for the one or more latency measurements.

In yet another exemplary aspect, a wireless communication method is disclosed. The method includes configuring, by a first network node, a discard timer for a backhaul channel, and determining, based on the discard timer, whether a data packet that is received is subsequently transmitted on the backhaul channel or discarded.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 5A-5C show examples of wireless communication methods.

DETAILED DESCRIPTION

As the number of applications and services for digital data continues to explode, the demands and challenges placed on network resources and operators will continue to increase. Being able to deliver a wide variety of network performance characteristics that future services will demand is one of the primary technical challenges faced by service providers today. The performance requirements placed on the network will demand connectivity in terms of data rate, latency, QOS, security, availability, and many other parameters, all of which will vary from one service to the next. Thus, enabling a network to allocate resources in a flexible manner to provide customized connectivity for each different type of service will greatly enhance the network's ability to meet future demands.

To meet these demands, the development of 5th Generation (5G) mobile wireless technologies and standards are well underway. One such technology is a split network architecture wherein the Radio Access Network (RAN) functionality is split between a Central Unit (CU) and multiple Distributed Units (DUs). For example, RAN functions may be split at the point between the Packet Data Convergence Protocol (PDCP) layer and the Radio Link Control (RLC) layer of the 5G protocol stack, wherein DUs will handle all processes up to and including the RLC layer functions and the CU will handle PDCP layer and higher layer functions prior to the core network. This disaggregation of RAN functions will provide numerous advantageous to mobile network operators. For example, through the isolation of the stack from the PDCP layer and upwards, the CU will be able to act as a cloud-based convergence point among multiple heterogeneous technologies in the provisioned networks and hence will be able to serve multiple heterogeneous DUs.

Another technology being developed for 5G networks is an Integrated Access and Backhaul (IAB) architecture for providing high-speed wireless backhaul to cell sites (e.g., base stations). As data demands and the number of cell sites increase, it is becoming more difficult to provide traditional fiber optic backhaul access to each cell site, which is especially true for small cell base stations. Under the IAB architecture, the same infrastructure and resources (e.g., IAB nodes) can be used to provide both access and backhaul to support User Equipment (UE) Packet Data Unit (PDU) sessions, for example. The IAB architecture for New Radio (NR) networks will provide wireless backhaul and relay links enabling flexible and dense deployment of NR cells without the need to increase the density of the transport network proportionately. Additionally, IAB technologies will allow for easier deployment of a dense network of self-backhauled NR cells in a more integrated and robust manner. For example, the IAB technology in the 5G NR network will support a multi-hop relay system, where the network topology also supports redundant connections.

Figure 1A:
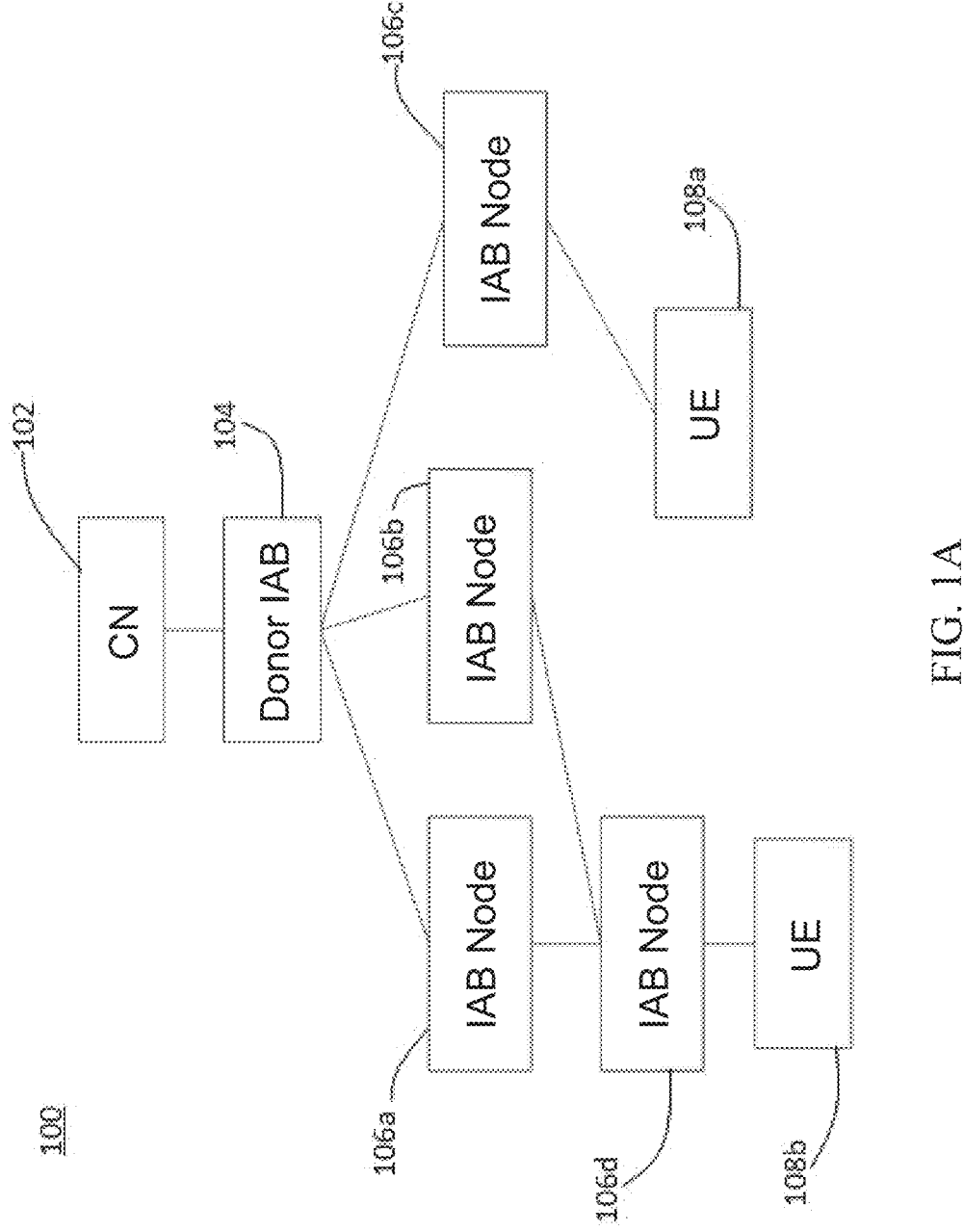
FIG. 1A shows an example of an Integrated Access and Backhaul (IAB) network.

FIG. 1A illustrates a block diagram of an IAB architecture network 100 wherein a core network 102 is connected to a donor IAB node 104. As used herein, the term "connected" refers to a wired or cabled connection (e.g., a fiber optic cable) between two nodes or devices. The donor IAB node 104 is wirelessly coupled to a plurality of intermediate IAB nodes 106a and 106b and two serving IAB nodes 106c and 106d. As used herein, the term "coupled" refers to direct or indirect and wired or wireless communications between two nodes or devices.

As shown in FIG. 1A, serving IAB nodes 106c and 106d are directly coupled to UEs 108a and 108b, respectively, and function as the serving cell site base stations or access points for the UEs 108a and 108b. The UEs 108a and 108b are referred to herein as "access UEs." The serving IAB nodes 106c and 106d also function as relay and can forward their respective UE signals to their respective next uplink nodes in the transmission path, and forward downlink signals to their respective UEs 108a and 108b. As shown in FIG. 1A, the serving IAB node 106c can forward uplink UE signals to one or both of the intermediate IAB nodes 106a and 106b, and receive downlink UE signals from one or both of the intermediate IAB nodes 106a and 106b. The intermediate IAB nodes 106a and 106b can forward uplink UE signals to the donor IAB node 104, and forward downlink signals to the serving IAB node 106d. The serving IAB node 106c can forward uplink UE signals to the donor IAB node 104, which can then forward all received signals to the core network 102, and can forward downlink signals from the donor IAB node 104 to the access UE 108a.

Each of the IAB nodes 106a-106d can have two functions: a base station (BS) function and a mobile terminal (MT) function. The BS function means the IAB node can work like a base station to provide the radio access function for a UE. As used herein, the "BS part" of an IAB node refers to that portion of the IAB node, including all hardware, firmware and/or software related to performing the BS functions of the IAB node. The MT function means the IAB node can work like a mobile terminal to be controlled and scheduled by the IAB donor node or an upper IAB node. As used herein the "MT part" of an IAB node refers to that portion of the IAB node, including all hardware, firmware and/or software related to performing the MT functions of the IAB node.

Referring still to FIG. 1A, if the network 100 also implements a split architecture, the donor IAB node 104 would be replaced by a donor CU (not shown) connected to the core network 102 and a donor DU (not shown) connected to the donor CU. Each of the IAB nodes 106a-106d would be coupled to the donor DU in similar fashion to their coupling to the donor IAB node 104, as shown in FIG. 1A.

In a split architecture network, each of the IAB nodes 106a-106d can have two functions: a DU function and a mobile terminal (MT) function. The DU function means the IAB node can work like a DU to provide the predetermined DU functions for a UE. As used herein, the "DU part" of an IAB node refers to that portion of the IAB node, including all hardware, firmware and/or software related to performing the DU functions of the IAB node. The MT function and MT part of an IAB node in a split architecture network is the same as described above for a non-split architecture network.

Figure 1B:
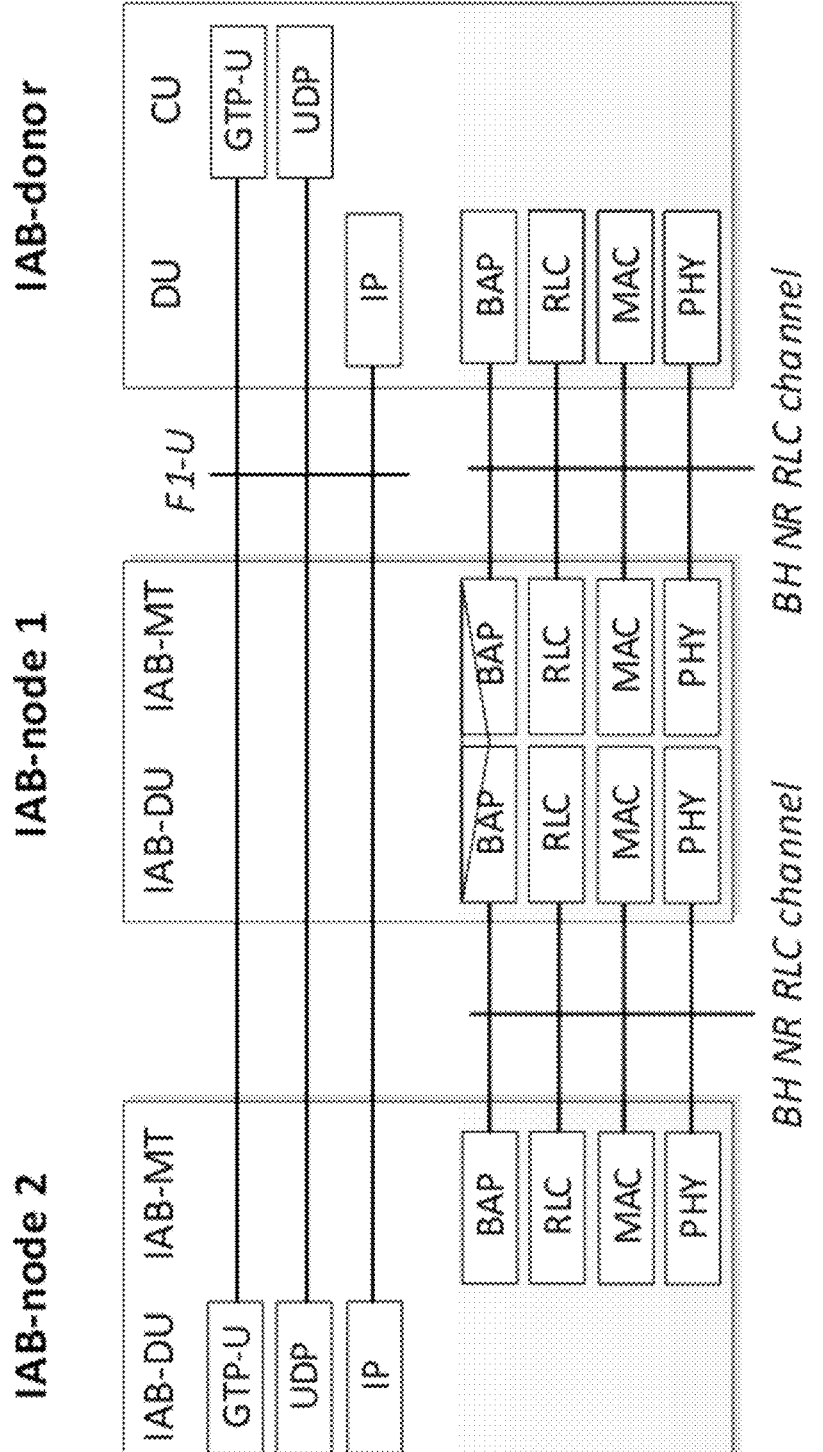
FIG. 1B shows an example of an IAB user plane protocol stack.

FIG. 1B shows the IAB user plane protocol stack between IAB-DU and IAB-donor-CU. F1-U use an IP transport layer between IAB-DU and IAB-donor-CU. The IP layer may be further security-protected. On the wireless backhaul, the IP layer is carried over the backhaul adaptation protocol (BAP) sublayer, which enables routing and bearer mapping over multiple hops. On each backhaul link, the BAP PDUs are carried by BH RLC channels. Multiple BH RLC channels can be configured on each BH link to allow traffic prioritization and QoS enforcement.

The implementation of the split architecture and the IAB architecture technologies in the 5G network has raised many challenges. One such challenge is that additional latency components (e.g., the latency between intermediate IAB nodes) should be considered. It is necessary to design a new discard mechanism for IAB nodes to determine whether the relayed data packet should be discarded or not.

Embodiments of the disclosed technology are directed to design latency aware routing mechanisms that guarantee the Packet Delay Budget (PDB) of UE Data Radio Bearer (DRB) in an Integrated Access and Backhaul (IAB) network. In an example, the donor CU could collect the one hop latency information within the IAB network and then configure the routing path whose accumulated latency is less than the PDB of the UE DRB/QoS flow. In another example, a packet discard mechanism which requires the IAB node to discard the data packet whose PDB requirement could not be satisfied can be designed. Alternatively, if the IAB node/donor DU detects the routing path selected for a data packet could not satisfy the PDB requirement, it may re-select the routing path that could satisfy the PDB requirement.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Overview of Latency in IAB Networks

Each QoS flow or UE DRB is associated with the 5 QI value which defines the Packet Delay Budget (PDB). PDB defines the upper bound for the time that a packet may be delayed between the UE and the UPF. The PDB is used to support the configuration of scheduling and link layer functions (e.g. the setting of scheduling priority weights and HARQ target operating points). For a delay critical GBR QoS flows, a packet delayed more than PDB is counted as lost if the transmitted data burst is less than Maximum Data Burst Volume within the period of PDB, the QoS flow does not exceed the GFBR. During the PDU session management procedure via Ng interface or during the UE context management procedure via F1 interface, the PDB is included in the QoS information of QoS flows and or DRBs.

Figure 2A:
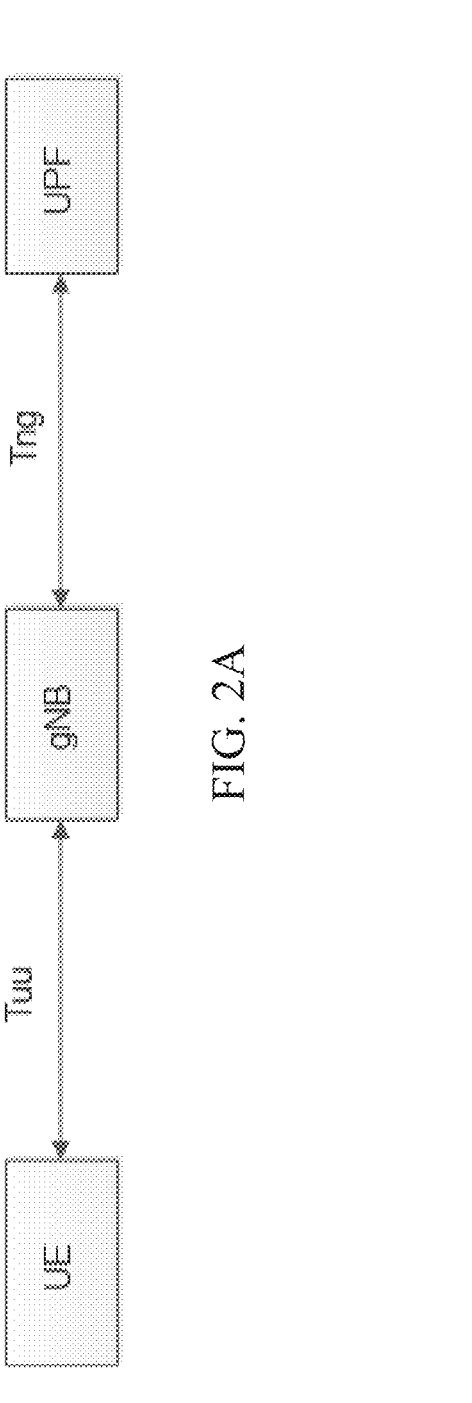
FIGS. 2A and 2B show examples of the packet delay budget (PDB) for New Radio (NR) and an IAB network, respectively.

As we can see from FIG. 2A, the PDB corresponding to a data packet includes the latency component of Tuu and Tng. According to current specification, the UL Tuu requirement is reflected via the PDCP discardTimer associated with each UE bearer. At reception of a PDCP SDU from upper layers, the transmitting PDCP entity shall start the discardTimer associated with this PDCP SDU. When the discardTimer expires for a PDCP SDU, the transmitting PDCP entity shall discard the PDCP SDU along with the corresponding PDCP Data PDU. If the corresponding PDCP Data PDU has already been submitted to lower layers, the discard is indicated to lower layers. With regard to the latency of Tng, no explicit indication is found in specification. However, it could be taken into account by gNB implementation. For example, gNB might estimate the Tng based on implementation and then configure the discardTimer with a value that is lower than (PDB−Tng). In this way, the PDB of a UL data packet transmission might be guaranteed.

Figure 2B:
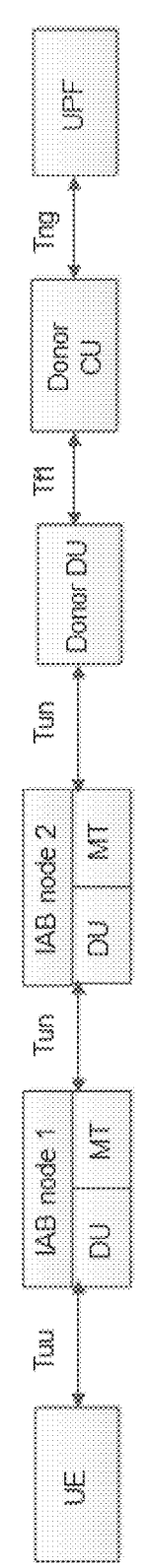

When it comes to IAB network, additional latency components should be considered for IAB network. As shown in FIG. 2B, in addition to the latency of Tuu and Tng, latency components such as Tun and Tf1 should also be considered. The Tun denotes the latency between IAB nodes or between IAB node and donor DU whereas Tf1 denotes the latency between Donor DU and Donor CU. Similar to Tng, the latency of Tf1 is over wireline transmission and could be derived based on donor CU's implementation. When donor CU performs the PDCP discardTimer configuration for UE's UL transmission, it might derive the discardTimer value by removing the latency component part of Tng and Tf1 from the PDB associated with the DRB. With UL transmission as an example, UE's transmitting PDCP entity shall start the discardTimer associated with this PDCP SDU upon reception of the PDCP SDU from upper layer. When the discardTimer expires for a PDCP SDU, the transmitting PDCP entity shall discard the PDCP SDU if it has not yet been transmitted to IAB node 1. Suppose the IAB node 1 receives the data packet from UE and schedules to transmit it to IAB node 2, it needs to further determine whether the PDB of the data packet can be guaranteed or not. As shown in FIG. 1B, the intermediate IAB node (e.g., IAB-node 1) does not support PDCP processing for relayed data packet, the PDCP based approach is no longer available.

On the other hand, BH RLC channel is configured on wireless backhaul link by IAB donor CU. The BH RLC channel is configured with QoS information or priority level and is used to deliver the backhaul CP and UP traffic. For the QoS information associated with BH RLC channels, the PDB defines the upper bound for the time that a packet may be delayed between the gNB-DU and its child IAB-MT. In this way, the PDB of BH RLC channel could be used to determine the priority level of logical channels and thus affects the scheduling decision.

Example Embodiments for Latency Measurements and Reporting

In some embodiments, when routing the data packet of a UE in an IAB network, the multi-hop data forwarding delay between IAB nodes should be considered for the total delay, which should be lower than the PDB. In order to support latency aware routing in a multi-hop IAB network, obtaining the potential per hop latency along different data forwarding paths should be considered.

The one hop latency might be roughly estimated by the time difference between packets arrive time and packets departure time within one IAB node. For example, the time between IAB node receive the packets from upper layer or neighbor IAB node to the packet is successfully transmitted (HARQ/ARQ ACK is received) can be detected as one hop latency. Moreover, considering the different priority and its impact on scheduling, the packets belong to different logical channels should be measured separately. Based on this observation, the one hop latency per RLC channel is more accurate for making routing decisions. Considering the latency fluctuation, the average latency per BH RLC channel/DRB/SRB might be a filtered value of the latency measurements of multiple data packets.

In some embodiments, the donor CU may configure the IAB MT/DU with latency measurement. For example, the donor CU may configure the IAB MT/DU as to whether the one hop latency should be measured, and or which BH RLC channel/DRB/SRB should be measured. In addition, the filtering coefficient might be configured for the one hop latency measurement. Moreover, the donor CU may configure the IAB MT/DU to report one hop latency.

In some embodiments, the donor CU may configure the IAB MT/DU with at least one of the following information: whether the one hop latency should be reported, the list of BH RLC channel/DRB/SRB for which one hop latency should be reported, whether the reporting is event-triggered or periodicity-triggered. For an event-triggered report, donor CU may further configure one or more latency thresholds. For example, when the measured one hop latency for a BH RLC channel exceeds threshold 1, the one hop latency should be reported. When the measured one hop latency for a BH RLC channel/DRB is less than threshold 2, the one hop latency should not be reported. When the change of the measured one hop latency is larger than threshold 3, the one hop latency should be reported. For a periodicity-triggered report, the donor CU may further configure the periodicity for the latency report.

Figures 3A, 3B:
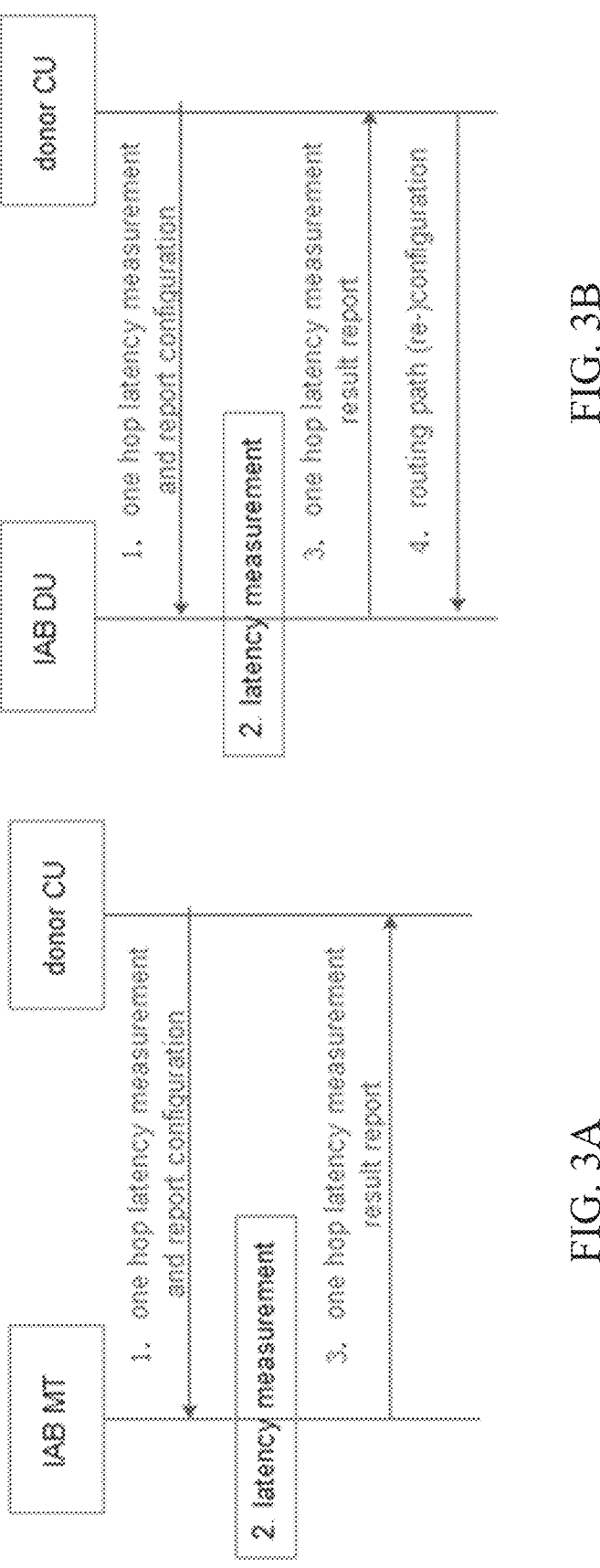
FIGS. 3A-3C show examples of latency measurements and reporting.

FIG. 3A shows an example wherein the IAB MT 1 is configured by donor CU to measure and periodically report one hop latency of BH RLC channel 1 and 2, which results in the IAB MT 1 measuring the one hop latency. Once the periodicity report timer expires, the IAB MT 1 may send the one hop latency to donor CU. In addition, the IAB MT1 may send the BH RLC channel ID/logical channel ID/DRB ID/SRB ID and or link ID and or UL/DL direction to donor CU. It should be noted that the link ID is the BAP address of the next hop node/UE where the BH RLC channel/DRB/SRB connects.

Similarly, and as shown in FIG. 3B, the IAB DU 1 is configured by donor CU to measure and report one hop latency of BH RLC channel 1 and 2, which results in the IAB MT 1 measuring the one hop latency. Once the event is triggered, the IAB DU 1 may send the one hop latency measurement result to donor CU. In addition, the IAB DU1 may send the BH RLC channel ID/logical channel ID/DRB ID/SRB ID and or link ID and or UL/DL direction to donor CU.

Figure 3C:
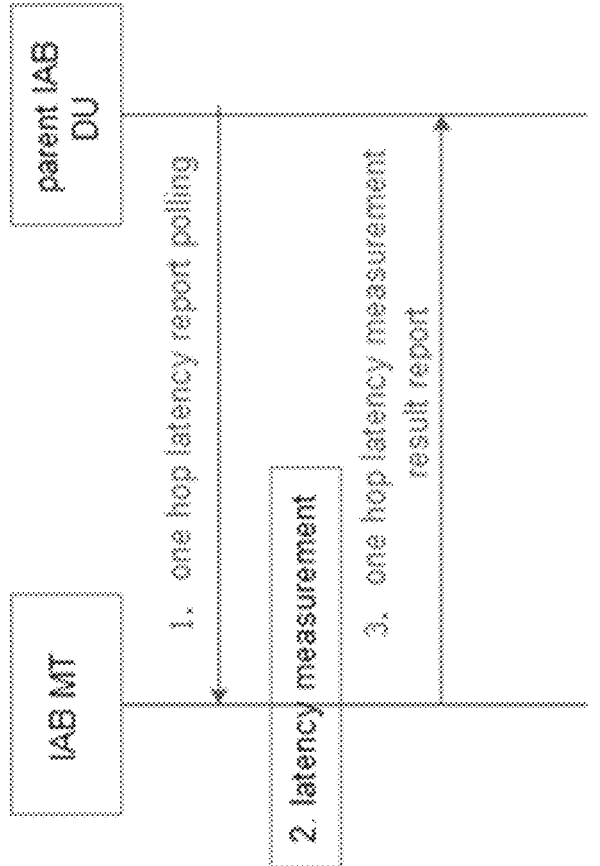

Moreover, in some embodiments, the IAB MT may report the one hop latency to parent IAB node as shown in FIG. 3C. In addition, the IAB DU may report the one hop latency to child IAB node. This report may be sent via BAP control PDU/MAC CE/RRC signalling. The one hop latency report may be delivered via the specific BH RLC channel/DRB/SRB. Alternatively, the one hop latency report may include the one hop latency and the associated BH RLC channel ID/logical channel ID/DRB ID/SRB ID. In addition, the one hop latency report may be sent upon the latency polling request from parent/child IAB node. The polling request may be delivered via the specific BH RLC channel/DRB/ logical channel. Alternatively, the latency polling request may include the BH RLC channel ID/logical channel ID/DRB ID/SRB ID. Based on the one hop latency report from IAB MT, parent IAB DU may report the one hop latency for both UL and DL direction to donor CU.

Although the operations above has been described in the context of the IAB DU/MT, they are equally applicable to the donor DU.

Upon receiving the one hop latency info from IAB MT/DU or donor DU, donor CU could estimate the latency for different routing paths. Suppose donor CU needs to set up a set of BH RLC channels to support a new UE DRB along a candidate routing path. Donor CU may use the one hop latency report of existing BH RLC channel/DRB/SRB with similar channel priority along the candidate routing path to estimate the potential latency. If no one hop latency with similar channel priority is available, donor CU may initially configure the routing path without considering the PDB associated with the UE DRB. Meanwhile, donor CU may configure the IAB nodes along the routing path to measure and report the one hop latency respectively. After the donor CU collect the one hop latency associated with the BH RLC channel along the routing path, donor CU may reconfigure the routing path associated with the UE DRB/ UL GTP tunnel/DL IP flow if necessary.

Example Embodiments for a Discard Mechanism Based on PDB

In some embodiments, the remaining packet delay budget for a data packet along the routing path in the multi-hop IAB network can be obtained, and used to support latency management in IAB networks.

Figures 4A, 4B:
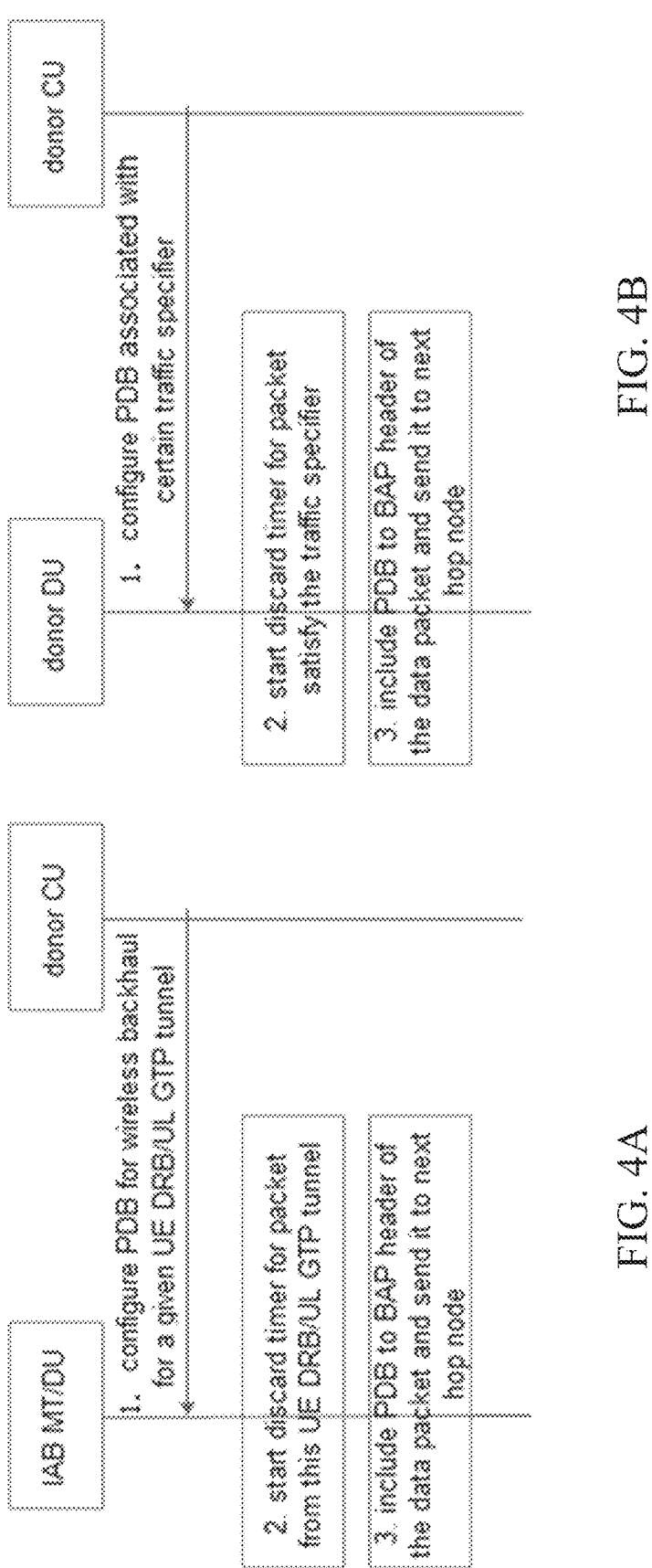
FIGS. 4A and 4B show examples of the PDB-based discard mechanism.

As shown in FIG. 4A, for the UL direction, donor CU may configure the access IAB node 1 with the PDB associated with certain UE DRB. As noted above, the PDB associated with UE DRB defines the upper bound for the time that a packet may be delayed between the UE and the UPF. In order for the access IAB node 1 to determine the potential PDB over wireless backhaul, donor CU may configure the access IAB node 1 with PDB associated with each UE DRB, which only indicates the allowable latency for wireless backhaul. The PDB for UE DRB could be used by access IAB MT 1 to set the BAP discard timer associated with the data packet from this UE DRB. In addition, access IAB node 1 could derive the remaining PDB.

In some embodiments, the remaining PDB may be derived by PDB for DRB minus one hop latency associated with the mapped egress BH RLC channel. Access IAB node 1 include the PDB field in the BAP header of this data packet. The PDB field may be set to the value of remaining PDB. Upon receiving the data packet as shown in FIG. 2B, IAB node 2 MT may use the PDB included in BAP header to set the BAP discard timer associated with the data packet. In addition, IAB node 2 could update the remaining PDB. The new remaining PDB may be derived by original PDB included in BAP header minus one hop latency associated with the mapped BH RLC channel. Then IAB node 2 updates PDB field in the BAP header of this data packet correspondingly. In this way, the PDB included in BAP header of each data packet is updated at each intermediate IAB node until it arrives donor DU. When the data packet arrives donor DU, donor DU shall remove the BAP header.

It should be noted that for access IAB node 1 and all the intermediate IAB node, if the discard timer associated with data packet/BAP PDU/SDU expires, the data packet/BAP PDU/SDU may be discarded. In addition, if the remaining PDB is less than 0, the BAP PDU/SDU may also be discarded.

As shown in FIG. 4B, for the DL direction, donor CU configures the donor DU with the PDB associated with DL IP flow. The DL IP flow could be identified by traffic identifier, such as a combination of destination IP address/ IPv6 prefix, IPv6 flow label, or Differentiated Services Code Point (DSCP). This PDB could be used by donor DU to set the BAP discard timer associated with the data packet that meets the traffic specifier, such as destination IP address/ IPv6 prefix, IPv6 flow label, or DSCP. In addition, donor DU could derive the remaining PDB. In some embodiments, the remaining PDB may be derived by PDB minus one hop latency associated with the mapped egress BH RLC channel. Then donor DU include the remaining PDB to the PDB field in the BAP header of this data packet. Upon receiving the data packet as shown in FIG. 2B, TAB node 2 DU may use the PDB included in BAP header to set the BAP discard timer associated with the data packet. In addition, TAB node 2 could update the remaining PDB. The new remaining PDB may be derived by original PDB included in BAP header minus one hop latency associated with the mapped egress BH RLC channel. Then TAB node 2 updates PDB field in the BAP header of this data packet correspondingly. In this way, the PDB included in BAP header of each data packet is updated at each intermediate TAB node until it arrives at destination TAB node 1. When the data packet arrives TAB node 1, TAB node 1 shall remove the BAP header. Furthermore, TAB node 1 DU may use the PDB included in BAP header to set the BAP discard timer associated with the data packet. In addition, TAB node 1 could derive the remaining PDB. In other embodiments, the remaining PDB may be derived by original PDB included in BAP header minus one hop latency associated with the UE DRB.

In some embodiments, for TAB node 1, donor DU and all the intermediate TAB nodes, if the discard timer associated with data packet/BAP PDU/SDU expires, the data packet/ BAP PDU/SDU may be discarded. On the other hand, if the remaining PDB is less than 0, the BAP PDU/SDU may also be discarded.

Considering that it is not necessary to include the PDB info in the BAP header for all the BAP PDUs, donor CU may send the indication to TAB DU/MT and or donor DU, which indicates whether PDB info should be included in BAP header. This indication may be indicated per UE DRB/traffic specifier (the combination of destination IP address/IPv6 prefix, IPv6 flow label and or DSCP)/BH RLC channel.

Example Embodiments for a Discard Mechanism Based on Timestamps and PDB

In some embodiments, it is assumed that all the UE and TAB nodes are synchronized and maintain the same timing. For UL, suppose the TAB node 1 receives the data packet at t1, the transmission start time of the data packet might be at t1. Alternatively, the TAB node 1 may derive the Tuu based on the report from UE or based on its downlink Uu transmission latency estimation. Alternatively, donor CU may configure the IAB node DU/MT 1 with the estimated one hop latency with UE DRB. Suppose the IAB node 1 receives the data packet at t1, the transmission start time of the data packet might be at t1 or (t1−Tuu). IAB node 1 could include the transmission start time of the data packet as the timestamp in the BAP header of the data packet.

Donor CU may configure the IAB node 1 DU/MT with PDB associated with each UE DRB. This PDB may indicate the PDB for the wireless backhaul. The PDB for UE DRB could be used by IAB MT 1 to set the BAP discard timer associated with the data packet from this UE DRB. Then the IAB node 1 DU/MT could determine whether the discard timer expires. If it has expired, this data packet will be discarded. IAB node 1 may include the PDB info field in the BAP header of this data packet.

Subsequently, the IAB node 1 MT transmits the data packet to parent IAB node 2. Upon receiving the data packet, IAB node 2 may get the timestamp information included in BAP header. Then the parent IAB node 2 checks if the packet should be discarded based on the timestamp information and the PDB info associated with this data packet. In some embodiments, the IAB node 2 may derive the time elapsed for the data packet by current time minus the timestamp included in the BAP header. If the time elapsed for the data packet is larger than the PDB included in the BAP header, the data packet should be discarded. This discard check is performed at each intermediate IAB node until the data packet arrives at the donor DU.

In addition, IAB node 2 may start the discard timer associated with the data packet. The initial value of the discard timer is set to the PDB minus the time elapsed for the data packet. Then the IAB node 2 DU/MT could determine whether the discard timer expires. If it has expired, this data packet will be discarded.

In some embodiments, for the DL, donor CU configures the donor DU with the PDB associated with DL IP flow. The DL IP flow could be identified by traffic identifier, such as a combination of destination IP address/IPv6 prefix, IPv6 flow label, or Differentiated Services Code Point (DSCP). Upon receiving the data packet from donor CU, the donor DU starts the discard timer for this data packet which is set to the associated PDB. Once the discard timer expires, the donor DU shall discard this data packet. Suppose the donor DU receives the data packet at t1, the donor DU may include the packet transmission start time (e.g., t1) as a timestamp in the BAP header and transmit it to IAB node 2. Moreover, donor DU may include the PDB info in the BAP header of this data packet.

Suppose the IAB node 2 receives the packet at t2, IAB node 2 could use the timestamp to determine the time elapsed by computing (t2–timestamp). IAB node 2 could use the remaining PDB (PDB–time elapsed) to set the discard timer and detect whether the data packet should be discarded or not. If not, the data packet is continuously forwarded along the data path towards serving IAB node 1. Each intermediate IAB node uses a similar mechanism as IAB node 2 to check if the PDB could be guaranteed or not.

As described above, the PDB of the data packet could be included in the BAP header together with the timestamp. Alternatively, donor CU could configure the PDB associated with DL IP flow. The DL IP flow could be identified by traffic identifier, such as a combination of destination IP address/IPv6 prefix, IPv6 flow label, or Differentiated Services Code Point (DSCP) to IAB node as well as donor DU. In this manner, it is not necessary to include the PDB in BAP header. Alternatively, the BAP header may contain the UE bearer/flow id which is set by the access IAB node and donor DU for UL and DL packet respectively. This requires the donor CU to configure the donor DU/IAB node DU with mapping between PDB and UE bearer/flow id or the combination of destination IP address/IP prefix, IPv6 flow label and or DSCP.

Example Embodiments for Latency- and Hop-Aware Rerouting

In some embodiments, latency- and hop-aware re-routing can be implemented for latency management in IAB networks. As previously described in the example embodiments for latency measurements and reporting, after the donor CU collects the one hop latency associated with the BH RLC channel along the routing path, donor CU may (re-)configure the appropriate routing path associated with the UE DRB/UL GTP tunnel/DL IP flow (identified by the combination of destination IP address/IP prefix, IPv6 flow label and or DSCP).

In addition, donor CU may configure the IAB DU/donor DU with routing information. The routing information includes at least one of the following information: routing index, routing id, next hop BAP address, egress BH RLC channel id, remain hop number, and per hop latency.

Upon receiving the packet, IAB node/donor DU determines the remaining PDB based on the example embodiments for a discard mechanism. In addition, IAB node/donor DU can determine the expected latency for the selected routing path as (remain hop number*per hop latency). Then IAB node/donor DU checks whether the remaining PDB is larger than the expected latency for the selected routing path. If it is, this selected routing path could be still used. Otherwise, IAB node/donor DU re-selects another routing path which has the same destination BAP address while the expected latency is less than or equal to the remaining PDB.

In some embodiments, and for the bearer mapping, the default BH RLC channel or any egress BH RLC channels can be used on the re-selected routing path so long as the expected latency is less than the remaining PDB. Furthermore, the IAB node MT/DU or donor DU may send the re-routing indication to donor CU. The reason for re-routing (e.g., latency or that the original routing path could not satisfy PDB) may also be sent to the donor CU. The routing id of original routing path which could not satisfy PDB may be also indicated to the donor CU. Upon receiving such indication, donor CU may correspondingly re-configure the routing path.

Example Embodiments for Latency-Aware Rerouting

In some embodiments, latency-aware re-routing can be implemented for latency management in IAB networks. As previously described in the example embodiments for latency measurements and reporting, after the donor CU collects the one hop latency associated with the BH RLC channel along the routing path, donor CU may (re-)configure the appropriate routing path associated with the UE DRB/UL GTP tunnel/DL IP flow (identified by the combination of destination IP address/IP prefix, IPv6 flow label and or DSCP).

In addition, donor CU may configure the IAB DU/donor DU with routing information. The routing information includes at least one of the following information: routing index, routing id, next hop BAP address, egress BH RLC channel id, estimated path latency, and remaining path latency.

Upon receiving the packet, IAB node/donor DU determines the remaining PDB based on the PDB information or timestamp information included in BAP header. Then IAB node/donor DU checks whether the remaining PDB is larger than the estimated path latency or remaining path latency for the selected routing path. If it is, this selected routing path could be still used. Otherwise, IAB node/donor DU re-selects another routing path which has the same destination BAP address while also ensuring that the expected latency is less than or equal to the remaining PDB.

In some embodiments, and for the bearer mapping, the default BH RLC channel or any egress BH RLC channels can be used on the reselected routing path so long as the estimated path latency or remaining path latency is less than the remaining PDB. Furthermore, the IAB node MT/DU or donor DU may indicate the re-routing due to latency or that the original routing path could not satisfy PDB to donor CU. The routing id of original routing path which could not satisfy PDB may be also indicated to the donor CU. Upon receiving such indication, donor CU may correspondingly re-configure the routing path. The estimated path latency or remaining path latency may also be referred to as path weight.

Example Embodiments for BH RLC Channel-Based Discard Mechanism

In some embodiments, a BH RLC channel based discard mechanism for IAB network can be used for latency management.

For the UL direction, donor CU may configure the IAB node MT with the discard timer associated with each BH RLC channel. Upon receiving the UL data packet, IAB node MT may start a discard timer for the data packet. The discard timer is based on the discard timer configuration for the corresponding egress BH RLC channel. If the discard timer associated with data packet/BAP PDU/SDU expires, the data packet/BAP PDU/SDU may be discard at IAB node MT.

For the DL direction, donor CU configures the donor DU/IAB DU with the discard timer associated with each BH RLC channel. Upon receiving the DL data packet, IAB node DU/donor DU may start a discard timer for the data packet. The discard timer is based on the discard timer configuration for the corresponding egress BH RLC channel. If the discard timer associated with data packet/BAP PDU/SDU expires, the data packet/BAP PDU/SDU may be discard at IAB node DU/donor DU.

Example Embodiments for Latency Configuration and Reporting

Based on considering different options for the latency report, donor CU could configure IAB MT/DU or donor DU with the indication of whether one hop latency should be reported to parent IAB node or donor CU. Considering the different choices for carrying latency relevant information in BAP header/BAP control PDU, donor CU could configure IAB MT/DU or donor DU with the indication of whether timestamp and or PDB shall be included in the BAP header or BAP control PDU. This indication may be configured per BH RLC channel/UE DRB/SRB.

Furthermore, IAB MT/DU could report the at least one of the following information, such as its latency measurement/ estimation capability, BAP discard capability, timestamp based BAP header, PDB based BAP header capability to donor CU.

In some embodiments, for the configuration/report between CU and DU, the F1 Application Protocol (F1AP) may be used to carry these information. For the configuration/report between MT and CU, RRC message may be used to carry this information. For the report/PDB/timestamp information between MT and DU, BAP header/BAP control PDU/MAC CE may be used to carry these information. The example embodiments for latency configuration and reporting are applicable to all the previously described embodiments.

Example Methods and Implementations for the Disclosed Technology

FIG. 5A shows an example of a wireless communication method. The method 500 includes, at operation 502, receiving, by a first network node from a second network node, a measurement configuration.

The method 500 includes, at operation 504, performing, based on the measurement configuration, one or more latency measurements.

The method 500 includes, at operation 506, transmitting, to the second network node, a measurement report comprising the one or more latency measurements or an identification of the channel used for the one or more latency measurements.

Figure 5B:
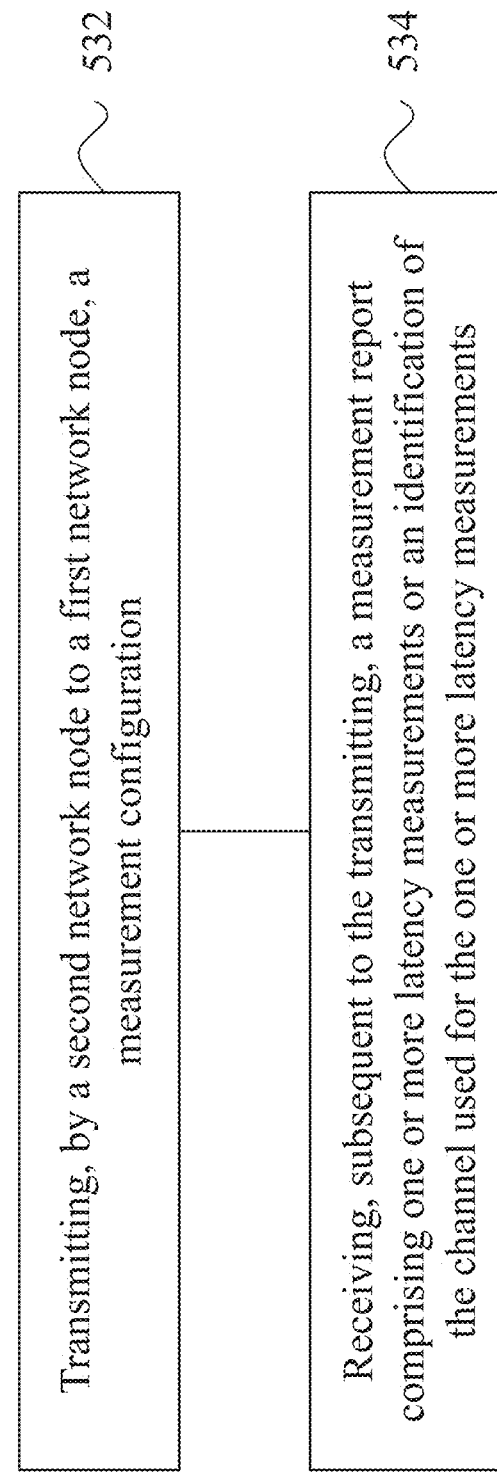

FIG. 5B shows an example of a wireless communication method. The method 530 includes, at operation 532, transmitting, by a second network node to a first network node, a measurement configuration.

The method 530 includes, at operation 534, receiving, subsequent to the transmitting, a measurement report comprising one or more latency measurements or an identification of the channel used for the one or more latency measurements.

In some embodiments, the method 530 further includes the operation of estimating, based on the measurement report, a latency for different routing paths.

In some embodiments, the method 530 further includes the operation of configuring, based on the measurement report, the first network node with a routing path that satisfies a packet delay budget (PDB) for a User Equipment (UE) Dedicated Radio Bearer (DRB), an uplink (UL) GPRS Tunnelling Protocol (GTP) tunnel, or a downlink (DL) Internet Protocol (IP) flow.

In some embodiments, the one or more latency measurements are for a packet transmission latency for an uplink channel or a downlink channel on a link of the first network node.

In some embodiments, the channel is a backhaul channel or a bearer channel.

In some embodiments, the backhaul channel is a backhaul (BH) Radio Link Control (RLC) channel, wherein the bearer channel is a Signaling Radio Bearer (SRB) or a Dedicated Radio Bearer (DRB), wherein the identification of the backhaul channel is a BH RLC channel ID, and wherein the identification of the bearer channel is an SRB ID or a DRB ID.

In some embodiments, the first network node comprises an Integrated Access and Backhaul (IAB) node or an IAB Mobile Termination (IAB MT) or an IAB distributed unit (IAB DU) or a donor distributed unit (donor DU), and wherein the second network node comprises a donor centralized unit (CU) or a base station (BS).

In some embodiments, the measurement configuration comprises one or more of the following: (a) an indication of whether the latency should be measured, (b) an indication of whether the backhaul channel or the bearer channel should be used to measure the latency, (c) a filtering coefficient for the one or more latency measurements, (d) an indication of whether the latency should be reported, (e) a list of backhaul or bearer channels for which the latency should be reported, (f) an indication of whether the measurement report is event-triggered and an associated latency threshold, and (g) an indication of whether the measurement report is periodicity-triggered and an associated periodicity for the measurement report.

In some embodiments, the first network node is configured to transmit the measurement report to a parent IAB node or a child IAB node.

In some embodiments, the first network node is configured to receive a polling request from the parent IAB node or the child IAB node.

In some embodiments, the polling request is transmitted over a specific or configured backhaul radio link control (RLC) channel.

In some embodiments, the first network node is configured to receive routing information from the second network node.

In some embodiments, the routing information comprises one or more of a routing identification (ID), a bearer ID, a next hop Backhaul Adaptation Protocol (BAP) address, an expected latency, a hop count, and a per-hop latency.

In some embodiments, the first network node is configured to receive a data packet that is destined for a third network node, and determine, based on the expected latency, the hop count, or the per-hop latency, whether a remaining value of a packet delay budget (PDB) is sufficient to use a selected routing path towards the third network node.

In some embodiments, the third network node is a donor distributed unit (donor DU) or an Integrated Access and Backhaul (IAB) node.

In some embodiments, the first network node is configured to select a new routing path upon a determination the remaining value of the PDB is not satisfied by the selected routing path, and transmit the data packet on the new routing path, wherein the new routing path comprises a destination Backhaul Adaptation Protocol (BAP) address identical to that of the selected routing path, and wherein an expected latency of the new routing path is less than or equal to the remaining value of the PDB.

In some embodiments, an expected latency of a default backhaul (BH) Radio Link Control (RLC) channel or an egress BH RLC channel is less than or equal to the remaining value of the PDB over the new routing path.

In some embodiments, the first network node is configured to transmit the data packet on the selected routing path upon a determination the remaining value of the PDB is satisfied by the selected routing path.

In some embodiments, the first network node is a first Integrated Access and Backhaul (IAB) node, wherein the second network node is a parent IAB node or a donor distributed unit (donor DU), and wherein the third network node is a second IAB node or a downstream IAB node.

In some embodiments, the first network node is a parent Integrated Access and Backhaul (IAB) node, wherein the second network node is an IAB node, and wherein the third network node is a donor distributed unit (donor DU).

In some embodiments, the first network node is a first donor distributed unit (donor DU), wherein the second node is a child Integrated Access and Backhaul (IAB) node, and wherein the third network node is a second donor DU.

In some embodiments, the one or more latency measurements comprise one-hop latency measurements.

Figure 5C:
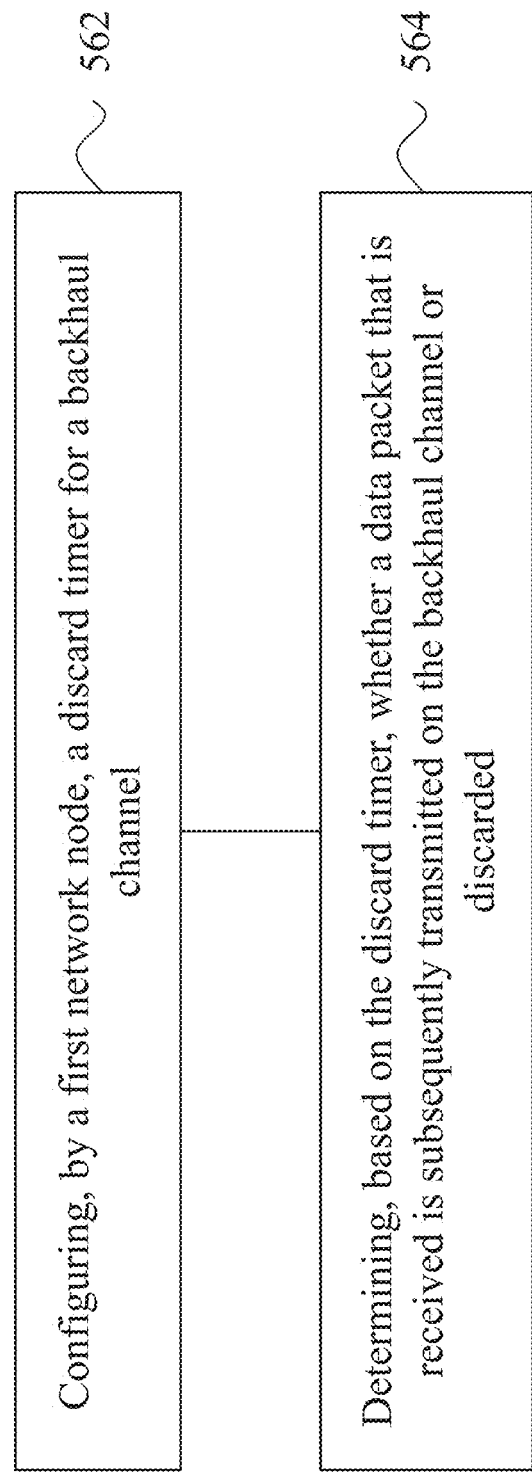

FIG. 5C shows an example of a wireless communication method. The method 560 includes, at operation 562, configuring, by a first network node, a discard timer for a backhaul channel.

The method 560 includes, at operation 564, determining, based on the discard timer, whether a data packet that is received is subsequently transmitted on the backhaul channel or discarded.

In some embodiments, the method 560 further includes the operation of receiving, by the first network node from a second network node, a configuration for the discard timer.

In some embodiments, the first network node is an Integrated Access and Backhaul (IAB) Mobile Termination (IAB MT), an IAB distributed unit (DU), or a donor DU, and wherein the second network node is a donor centralized unit (donor CU).

In some embodiments, the method 560 further includes the operation of starting, upon a reception of the data packet for the backhaul channel, the discard timer, and discarding the data packet upon a determination the discard timer has expired.

In some embodiments, a Backhaul Adaptation Protocol (BAP) header of the data packet comprises a packet delay budget (PDB), and wherein the discard timer is configured based on the PDB.

In some embodiments, the PDB is configured by a second network node that is associated with a combination of one or more of a UE Dedicated Radio Bearer (DRB), an Uplink (UL) User Plane (UP) Transport Network Layer (TNL) information, a destination Internet Protocol (IP) address, an IPv6 prefix, an IPv6 flow label, or a Differentiated Services Code Point (DSCP).

In some embodiments, a Backhaul Adaptation Protocol (BAP) header of the data packet comprises a timestamp, and wherein the discard timer is configured based on the timestamp.

In some embodiments, the data packet comprises a BAP Protocol Data Unit (PDU) or a Service Data Unit (SDU).

Figure 6:
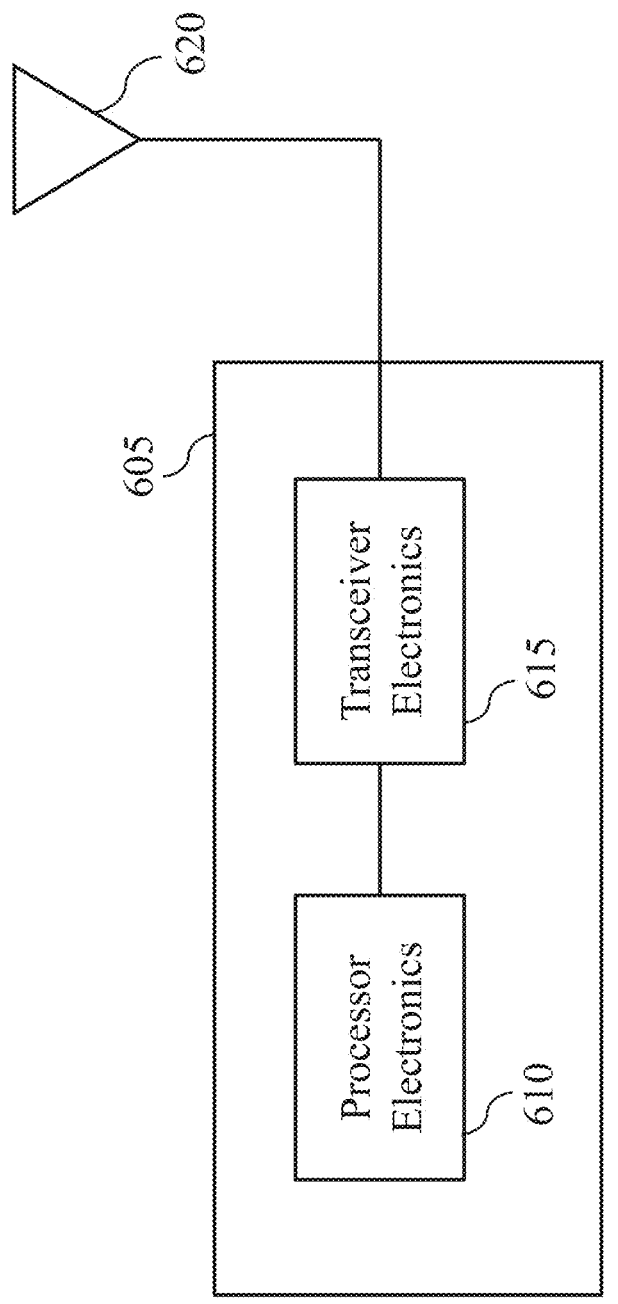
FIG. 6 is a block diagram representation of a portion of an apparatus that can be used to implement methods and techniques described in this document.

FIG. 6 is a block diagram representation of a portion of an apparatus, in accordance with some embodiments of the presently disclosed technology. An apparatus 605, such as a base station or a wireless device (or UE), can include processor electronics 610 such as a microprocessor that implements one or more of the techniques presented in this document. The apparatus 605 can include transceiver electronics 615 to send and/or receive wireless signals over one or more communication interfaces such as antenna(s) 620. The apparatus 605 can include other communication interfaces for transmitting and receiving data. Apparatus 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the apparatus 605.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication comprising:
receiving, by a first network node from a second network node, a measurement configuration, wherein the first network node comprises an Integrated Access and Backhaul (IAB) node, an IAB Mobile Termination (IAB MT), an IAB distributed unit (IAB DU), or a donor distributed unit (donor DU), and wherein the second network node comprises a donor centralized unit (CU) or a base station (BS);
performing, based on the measurement configuration, one or more latency measurements;
transmitting, to the second network node, a measurement report comprising the one or more latency measurements or an identification of a channel used for the one or more latency measurements;

receiving routing information from the second network node, wherein the routing information comprises one or more of a routing identification (ID), a bearer ID, a next hop Backhaul Adaptation Protocol (BAP) address, an expected latency, a hop count, or a per-hop latency;
receiving a data packet that is destined for a third network node;
determining, based on the expected latency, the hop count, or the per-hop latency, whether a remaining value of a packet delay budget (PDB) is sufficient to use a selected routing path towards the third network node; and
 (1) transmitting the data packet on the selected routing path upon a determination the remaining value of the PDB is satisfied by the selected routing path; or
 (2) selecting a new routing path upon a determination that the remaining value of the PDB is not satisfied by the selected routing path, and transmitting the data packet on the new routing path, wherein the new routing path comprises a destination Backhaul Adaptation Protocol (BAP) address identical to that of the selected routing path, and wherein an expected latency of the new routing path is less than or equal to the remaining value of the PDB.

2. The method of claim 1, wherein the channel is a backhaul channel or a bearer channel, wherein the backhaul channel is a backhaul (BH) Radio Link Control (RLC) channel, wherein the bearer channel is a Signaling Radio Bearer (SRB) or a Dedicated Radio Bearer (DRB), wherein the identification of the backhaul channel is a BH RLC channel ID, and wherein the identification of the bearer channel is an SRB ID or a DRB ID.

3. The method of claim 1, wherein the measurement configuration comprises one or more of the following:
 (a) an indication of whether a latency should be measured;
 (b) an indication of whether a backhaul channel or a bearer channel should be used to measure the latency;
 (c) a filtering coefficient for the one or more latency measurements;
 (d) an indication of whether the latency should be reported;
 (e) a list of backhaul or bearer channels for which the latency should be reported;
 (f) an indication of whether the measurement report is event-triggered and an associated latency threshold; or
 (g) an indication of whether the measurement report is periodicity-triggered and an associated periodicity for the measurement report.

4. A method of wireless communication comprising:
transmitting, by a second network node to a first network node, a measurement configuration wherein the first network node comprises an Integrated Access and Backhaul (IAB) node, an IAB Mobile Termination (IAB MT), an IAB distributed unit (IAB DU), or a donor distributed unit (donor DU), and wherein the second network node comprises a donor centralized unit (CU) or a base station (BS);
receiving, subsequent to the transmitting, a measurement report comprising one or more latency measurements or an identification of a channel used for the one or more latency measurements; and
transmitting routing information from the second network node to the first network node, wherein the routing information comprises one or more of a routing identification (ID), a bearer ID, a next hop Backhaul Adaptation Protocol (BAP) address, an expected latency, a hop count, or a per-hop latency, and wherein the first network node is configured to:

receive a data packet that is destined for a third network node;

determine, based on the expected latency, the hop count, or the per-hop latency, whether a remaining value of a packet delay budget (PDB) is sufficient to use a selected routing path towards the third network node; and (1) transmit the data packet on the selected routing path upon a determination the remaining value of the PDB is satisfied by the selected routing path; or (2) select a new routing path upon a determination that the remaining value of the PDB is not satisfied by the selected routing path, and transmit the data packet on the new routing path, wherein the new routing path comprises a destination Backhaul Adaptation Protocol (BAP) address identical to that of the selected routing path, and wherein an expected latency of the new routing path is less than or equal to the remaining value of the PDB.

5. The method of claim 4, further comprising:

configuring, based on the measurement report, the first network node with a routing path that satisfies a packet delay budget (PDB) for a User Equipment (UE) Dedicated Radio Bearer (DRB), an uplink (UL) GPRS Tunnelling Protocol (GTP) tunnel, or a downlink (DL) Internet Protocol (IP) flow.

6. The method of claim 4, wherein the channel is a backhaul channel or a bearer channel, wherein the backhaul channel is a backhaul (BH) Radio Link Control (RLC) channel, wherein the bearer channel is a Signaling Radio Bearer (SRB) or a Dedicated Radio Bearer (DRB), wherein the identification of the backhaul channel is a BH RLC channel ID, and wherein the identification of the bearer channel is an SRB ID or a DRB ID.

7. The method of claim 4, wherein the measurement configuration comprises one or more of the following:

(a) an indication of whether a latency should be measured, (b) an indication of whether a backhaul channel or a bearer channel should be used to measure the latency, (c) a filtering coefficient for the one or more latency measurements, (d) an indication of whether the latency should be reported, (e) a list of backhaul or bearer channels for which the latency should be reported, (f) an indication of whether the measurement report is event-triggered and an associated latency threshold, or (g) an indication of whether the measurement report is periodicity-triggered and an associated periodicity for the measurement report.

8. A wireless communication apparatus comprising processor electronics and a memory storing instructions, execution of which by the processor electronics causes the apparatus to perform operations comprising:

receiving, by the apparatus from a network node, a measurement configuration, wherein the apparatus comprises an Integrated Access and Backhaul (IAB) node, an IAB Mobile Termination (IAB MT), an IAB distributed unit (IAB DU), or a donor distributed unit (donor DU), and wherein the network node comprises a donor centralized unit (CU) or a base station (BS);

performing, based on the measurement configuration, one or more latency measurements;

transmitting, to the network node, a measurement report comprising the one or more latency measurements or an identification of a channel used for the one or more latency measurements;

receiving routing information from the network node, wherein the routing information comprises one or more of a routing identification (ID), a bearer ID, a next hop Backhaul Adaptation Protocol (BAP) address, an expected latency, a hop count, or a per-hop latency;

receiving a data packet that is destined for a second network node;

determining, based on the expected latency, the hop count, or the per-hop latency, whether a remaining value of a packet delay budget (PDB) is sufficient to use a selected routing path towards the second network node; and (1) transmitting the data packet on the selected routing path upon a determination the remaining value of the PDB is satisfied by the selected routing path; or (2) selecting a new routing path upon a determination that the remaining value of the PDB is not satisfied by the selected routing path, and transmitting the data packet on the new routing path, wherein the new routing path comprises a destination Backhaul Adaptation Protocol (BAP) address identical to that of the selected routing path, and wherein an expected latency of the new routing path is less than or equal to the remaining value of the PDB.

9. The apparatus of claim 8, wherein the channel is a backhaul channel or a bearer channel, wherein the backhaul channel is a backhaul (BH) Radio Link Control (RLC) channel, wherein the bearer channel is a Signaling Radio Bearer (SRB) or a Dedicated Radio Bearer (DRB), wherein the identification of the backhaul channel is a BH RLC channel ID, and wherein the identification of the bearer channel is an SRB ID or a DRB ID.

10. A wireless communication apparatus comprising processor electronics and a memory storing instructions, execution of which by the processor electronics causes the apparatus to perform operations comprising:

transmitting, to a network node, a measurement configuration wherein the network node comprises an Integrated Access and Backhaul (IAB) node, an IAB Mobile Termination (IAB MT), an IAB distributed unit (IAB DU), or a donor distributed unit (donor DU), and wherein the apparatus comprises a donor centralized unit (CU) or a base station (BS);

receiving, subsequent to the transmitting, a measurement report comprising one or more latency measurements or an identification of a channel used for the one or more latency measurements; and transmitting routing information from the apparatus to the network node, wherein the routing information comprises one or more of a routing identification (ID), a bearer ID, a next hop Backhaul Adaptation Protocol (BAP) address, an expected latency, a hop count, or a per-hop latency, and wherein the network node is configured to:

receive a data packet that is destined for a second network node;

determine, based on the expected latency, the hop count, or the per-hop latency, whether a remaining value of a packet delay budget (PDB) is sufficient to use a selected routing path towards the second network node; and (1) transmit the data packet on the selected routing path upon a determination the remaining value of the PDB is satisfied by the selected routing path; or (2) select a new routing path upon a determination that the remaining value of the PDB is not satisfied by the selected routing path, and transmit the data packet on the new routing path, wherein the new routing path comprises a destination Backhaul Adaptation Protocol (BAP) address identical to that of the selected routing path, and wherein an expected latency of the new routing path is less than or equal to the remaining value of the PDB.

11. The apparatus of claim 10, the operations further comprising:

configuring, based on the measurement report, the network node with a routing path that satisfies a packet delay budget (PDB) for a User Equipment (UE) Dedicated Radio Bearer (DRB), an uplink (UL) GPRS Tunnelling Protocol (GTP) tunnel, or a downlink (DL) Internet Protocol (IP) flow.

12. The apparatus of claim 10, wherein the channel is a backhaul channel or a bearer channel, wherein the backhaul channel is a backhaul (BH) Radio Link Control (RLC) channel, wherein the bearer channel is a Signaling Radio Bearer (SRB) or a Dedicated Radio Bearer (DRB), wherein the identification of the backhaul channel is a BH RLC channel ID, and wherein the identification of the bearer channel is an SRB ID or a DRB ID.

* * * * *